United States Patent [19]

Dyck

[11] 4,127,239
[45] Nov. 28, 1978

[54] ENDLESS SOUND REPRODUCING TAPE CARTRIDGE

[75] Inventor: Arthur Dyck, Coquitlam, Canada

[73] Assignee: International Audio Visual Hong Kong, Kowloon, Hong Kong

[21] Appl. No.: 796,007

[22] Filed: May 11, 1977

[51] Int. Cl.² .......................................... B65H 17/48
[52] U.S. Cl. .............................. 242/55.19 A; 242/198
[58] Field of Search ................ 242/55.19 A, 198, 199, 242/200; 360/93, 132

[56] References Cited

U.S. PATENT DOCUMENTS

| | | | |
|---|---|---|---|
| 2,922,642 | 1/1960 | Cousino | 242/55.19 A |
| 2,951,654 | 9/1960 | Steelman | 242/55.19 A |
| 3,287,508 | 11/1966 | Morrison | 242/55.19 A |
| 3,322,360 | 5/1967 | Roys | 242/55.19 A |
| 3,420,461 | 1/1969 | Cousino | 242/55.19 A |
| 3,945,582 | 3/1976 | Vogi | 242/55.19 A |

*Primary Examiner*—Edward J. McCarthy
*Attorney, Agent, or Firm*—John J. Posta, Jr.

[57] ABSTRACT

The improved tape cartridge of the present invention comprises a hollow casing formed of a top cover and base member releasably secured together, as by vertically oriented opposed locking members, a tape holder rotatably secured in the casing, and an endless roll of tape on the holder. Improved means for automatically preventing movement of the tape (and thus danger of tangling) except when in a sound reproducing device are provided. Such means are in the form of a pair of resilient arms secured to opposite sides of the casing and bearing wedge-shaped heads directed against the underside of a movable portion of the top cover. That movable cover portion in turn has on its underside a brake bar which bears against the upper margin of either the tape roll or the tape holder itself to prevent rotation of the roll, except when the movable cover portion is biased upwardly by the heads. This occurs only when the heads are pressed against the casing upon insertion into a sound reproducing mechanism. The heads act through openings in depending portions of the top cover so as to prevent distortion of the casing. The cartridge may also include a knock-out portion to receive an erase prevention sensing pin and a hinged front portion to facilitate loading and guiding of the tape around internal tape guides. The cartridge is simple, durable, inexpensive and effective. It can be easily assembled automatically merely by vertical movements of its relatively few components.

14 Claims, 10 Drawing Figures

ENDLESS SOUND REPRODUCING TAPE CARTRIDGE

BACKGROUND OF THE INVENTION

1. Field of the Invention

The present invention generally relates to sound reproducing components and more particularly to an improved endless sound reproducing tape cartridge.

2. Prior Art

Various types of endless sound reproducing magnetic tape cartridges are known in the art. One improved type is that set forth in U.S. Pat. No. 3,420,461, entitled "Endless Magnetic Tape Cartridge", issued Jan. 7, 1969 to R. E. Causino. That cartridge features an endless roll of magnetic tape, the inner loop of which is trained around angled tape guides into a position which is at right angles to the position of the tape in the roll and is then contacted by the drive capstan and playing head of the sound reproducing mechanism. This change in orientation is carried out in order to permit the tape cartridge to be more compact than other types of cartridges employing a different tape orientation. The improved tape cartridge of U.S. Pat. No. 3,420,461 also employs a tape brake which automatically locks tape holder disc thereby holding the tape roll against rotation except when in the sound reproducing device. However, such brake is relatively complicated and includes a number of parts difficult to assemble together, particularly on automated machinery.

Therefore, it would be desirable to provide an improved endless tape cartridge, preferably of the general type of that of U.S. Pat. No. 3,420,461 and having its advantages but which could be more easily assembled, particularly on automated equipment, and which would comprise a fewer number of components and would be less expensive to produce. Such device preferably should provide improved tape braking means, improved means for training tape around guides and for inspecting the same, and means for permitting erasure of the tape as desired.

SUMMARY OF THE INVENTION

The foregoing needs and desires have been satisfied by the improved endless magnetic tape cartridge of the present invention. The cartridge is substantially as set forth in the Abstract above. Thus, it comprises a casing having a top cover and base member releasably locked together by vertically aligned pin members, an endless roll of tape disposed on a rotatable tape holder in the casing, and improved brake means, including a resiliently movable portion of the top cover, a brake bar carried by the movable top cover portion and normally bearing against the upper margin or either the tape roll or tape holder to prevent rotation thereof, and biasing means for biasing the movable top cover portion and brake bar up out of contact with the tape roll and tape holder when the cartridge is placed in a sound reproducing mechanism.

The biasing means includes at least one and preferably a pair of resilient arms secured to the opposite sides of the casing. The arms bear wedge-shaped heads which are directed through openings in the depending portion of the top cover and into contact with the underside of the movable top cover portion. When the cartridge is placed in a sound reproducing device, the heads are automatically squeezed into the side openings and wedgingly bias the movable top cover portion up so that contact between the brake bar and tape or tape holder ceases, and the roll can rotate. This braking mechanism is simple, requiring no additional parts, and therefore permits the entire cartridge to be easily assembled in an automated assembly line merely with vertical movements. Moreover, when the arms are carried on the base member, the heads act as additional releasable locking members to hold the parts of the casing together. The top cover and base member bear, in any event, vertically oriented locking pins which facilitate the assembly of the cartridge.

In one embodiment of the invention, the tape holder may include a central spindle with raised rim and a horizontally extending disc with depressed portion adjacent the raised rim so that the portion of the roll supported on the depressed portion does not extend above the raised rim. This feature permits the brake bar to contact the raised rim when the tape roll is small and less able to withstand the pressure of the brake. However, when the roll is large, the upper margins of the periphery thereof will be above the level of the raised rim and will contact the brake bar. They can, due to their increased surface area, better withstand the brake pressure.

The improved cartridge may also include a hinged front end to permit easy access to the tape during assembly and inspection of the cartridge. The cartridge may also include a removable or knock-out portion covering an aperture adapted to receive an erase prevention sensing pin from the sound reproducing mechanism into which the cartridge is to be inserted. Other features are set forth in the following detailed description and accompanying drawings.

DRAWINGS

DETAILED DESCRIPTION

Figure 1:
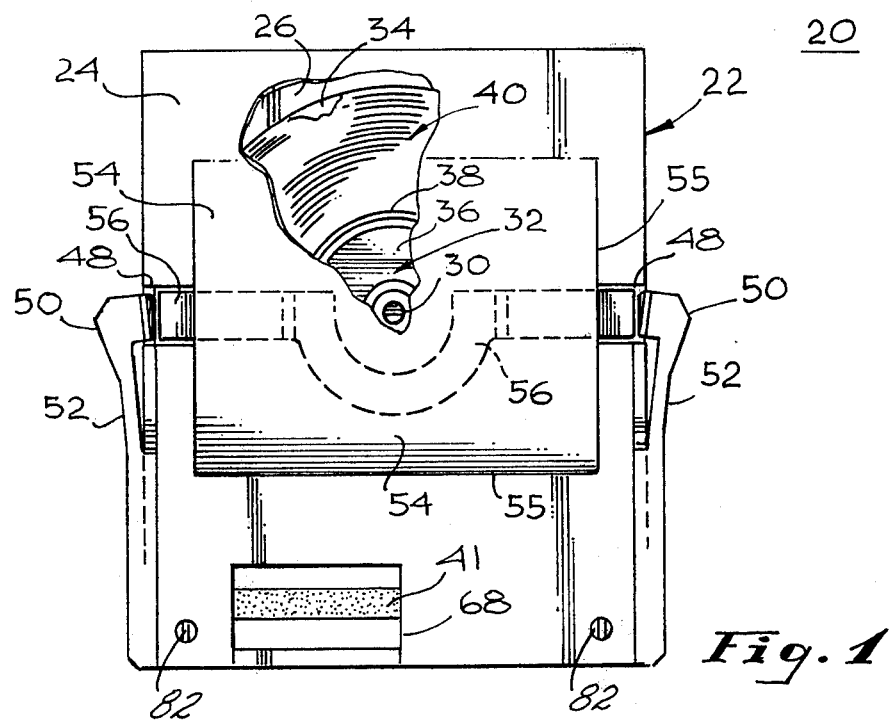
FIG. 1 is a schematic top plan view, partly broken away, of a preferred embodiment of the improved endless tape cartridge of the present invention, with the tape roll thereof locked against rotation.
Figure 8:
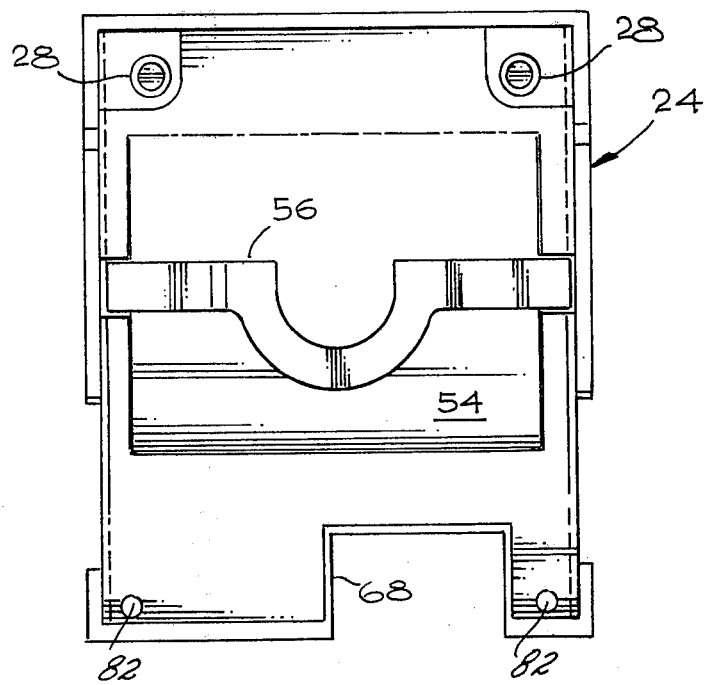
FIG. 8 is a schematic bottom plan view of the top cover of the cartridge of FIG. 1.

Now referring more particularly to FIG. 1 of the accompanying drawings, a preferred embodiment of the improved endless magnetic tape cartridge of the present invention is schematically depicted therein in top plan view. Thus, a cartridge 20 is shown which includes a rectangular hollow casing 22 comprising a top cover 24 and a base member 26 releasably interconnected through opposed vertically aligned internal pin members 28 (FIGS. 8 and 9) adjacent corners thereof. Pin members 28 permit easy automated assembly of cover 24 and member 26, utilizing only vertical movements of, for example, suction apparatus.

Base member 26 also includes a central vertical pin 30 around which tape holder 32 is rotatably received. Tape holder 32 includes a generally horizontally extending disc 34 integrally connected to a generally vertically oriented central spindle 36 having a raised outer margin or rim 38 and disposed on pin 30. A roll 40 of tape 41 is disposed around spindle 36 and rests on disc 34 within casing 22.

Figure 2:
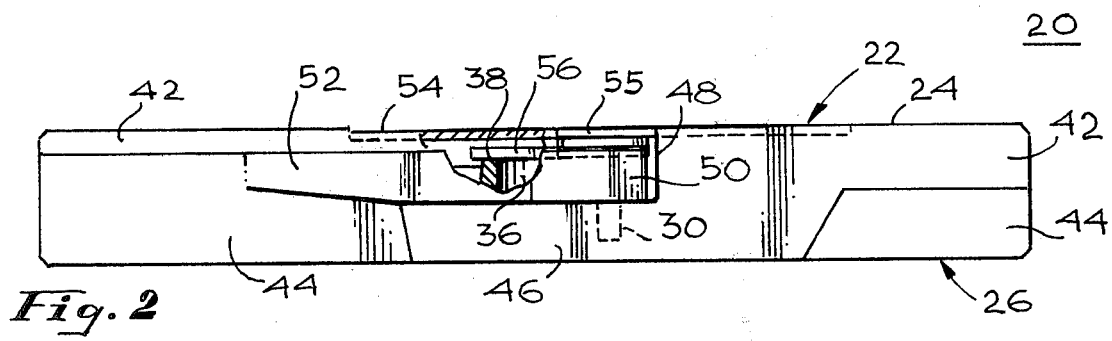
FIG. 2 is a schematic side elevation, partly broken away, of the tape cartridge of FIG. 1.
Figure 4:
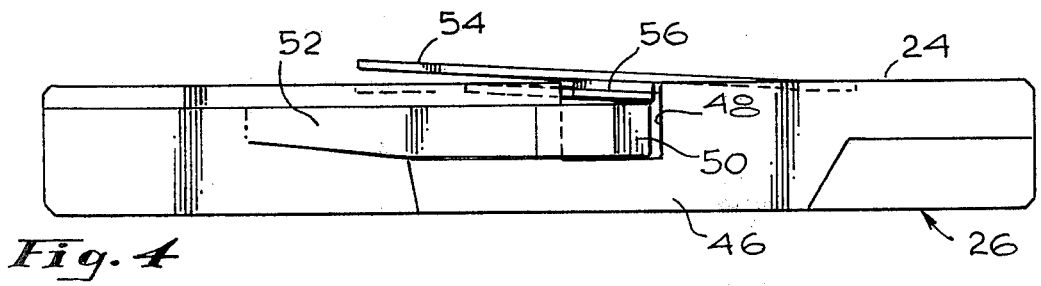
FIG. 4 is a schematic side elevation, partly broken away, of the tape cartridge of FIG. 3.

Top cover 24 has depending peripheral margins 42 (FIGS. 2 and 4) and base member 26 has raised peripheral margins 44 (FIGS. 2 and 4) which abut margins 42. In the area designated 46 on opposite sides of casing 22, margins 42 depend to the bottom of base member 26 and define a pair of openings 48 through which a pair of wedge-shaped heads 50 extend into contact with the underside of top cover 24. Heads 50 are suspended on flexible elongated arms 52 secured to opposite side margins 44 of base member 26.

A portion 54 of top cover is movable. That is, portion 54 is cut from cover 24 along front and side margins 55 but is still connected to cover 24 at the rear end thereof (FIG. 1). Movable portion 54 has a brake bar 56 attached to and extending across the underside thereof, and it is that underside of this brake bar 56 which is contacted by the upper surface of heads 50 within openings 48.

Figure 10:
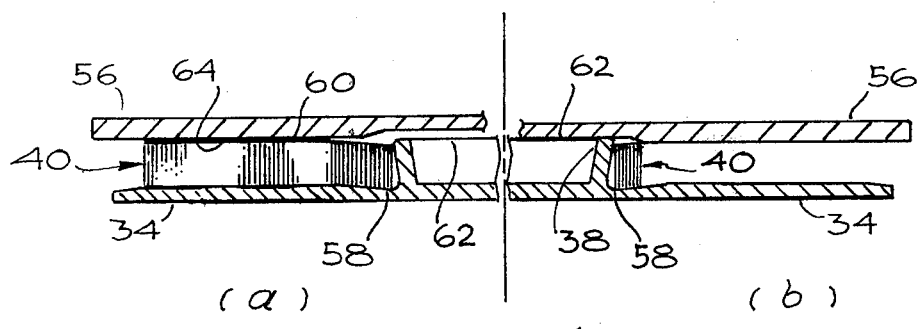

Brake bar 56 normally presses upon either tape roll 40 or raised rim 38, as shown in FIG. 10. Thus, disc 34 adjacent raised rim 38 has a depressed portion 58 dimensioned so that the upper margin 60 of the portion of tape roll 40 supported thereon does not extend above the top 62 of rim 38. However, the portion (of any) of roll 40 outside of, that is, lateral of that supported on portion 58 has its upper margin 64 above top 62 of rim 38.

In view "a" of FIG. 10, roll 40 is shown sufficiently large so that bar 56 normally presses on the relatively large area of margin 64, effectively preventing rotation of roll 40, but not pressure warping roll 40. In view "b" of FIG. 10, roll 40 is shown sufficiently small so that if bar 56 were to press on it, distortion of roll 40 might occur. However, due to the depressed portion 58, margin 60 is protected, and brake 56 acts to prevent rotation of roll 40 only by pressing against top 62 of rim 38. This arrangement represents a distinctively advantageous safety feature for roll 40.

Figure 3:
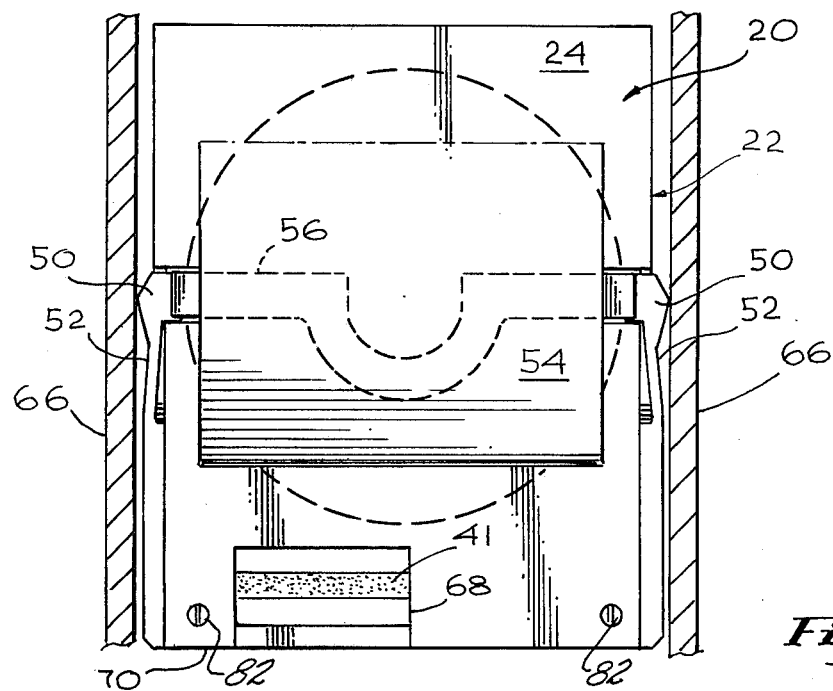
FIG. 3 is a schematic top plan view of the tape cartridge of FIG. 1, shown in a portion of a sound reproducing mechanism with the tape roll thereof free to rotate.

It will be understood from the above, that bar 56 is dimensioned relative to spindle 38 and roll 40 so that roll 40 or spindle 38 is normally held against rotation, that is, roll 40 is normally in the automatically locked position, so that it cannot become unwound and/or tangled during normal handling, storage, etc. However, when cartridge 20 is inserted into a sound reproducing device, roll 40 and spindle 38 are automatically unlocked and can rotate. In such instance, heads 50 are pushed towards casing 22 by the walls 66 (FIG. 3) of the sound reproducing mechanism (not shown) so to bias movable portion 54 up (FIG. 4), thus moving brake bar 56 out of contact with both roll 40 and spindle 38, and permitting roll 40 to rotate with spindle 38, for driving by a suitable conventional tape transport mechanism or the like (not shown).

Accordingly, the tape brake mechanism of the present invention is automatically activated whenever tape cartridge 20 is out of the sound reproducing device and is automatically inactivated whenever tape cartridge 20 is in such device. Such device may be any standard or conventional device capable of accepting cartridge 20 for the described purposes. Since heads 50 act only on cover 24, that is, portions 46, 54 and 56 thereof, they cannot distort either cover 24 or base member 26 during biasing of portion 56. Moreover, they act as a supplementary releasable locking means for securing base member 26 to cover 24.

Cartridge 20 is provided with suitable means for exposing tape 41 to recording and playback mechanisms (not shown) and to tape drive mechanisms (not shown) while fully protected in cartridge 20. Thus, for example, top cover 24 may have apertures 68 (FIGS. 1 and 3) through which a sound recording and playback head or drive wheel (not shown) may reach tape 41. It will be noted that it is desirable, although not absolutely necessary, that tape 41 be oriented in aperture 68 at 90° from the orientation of tape roll 40. This enables cartridge 20 to be made very compact.

Figure 7:
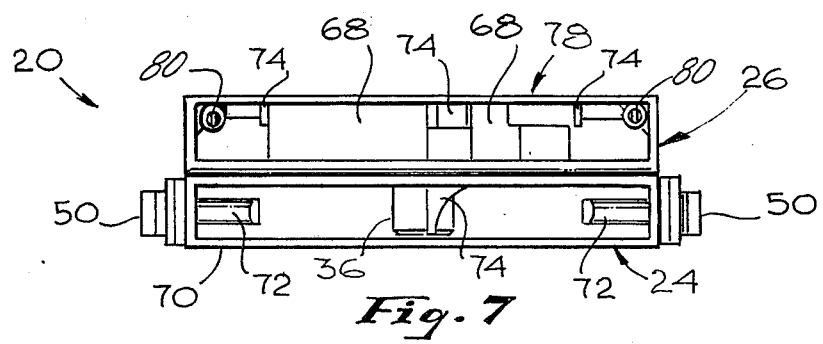
FIG. 7 is a schematic front end view of the tape cartridge of FIG. 1, showing the front end of said cartridge open.
Figure 9:
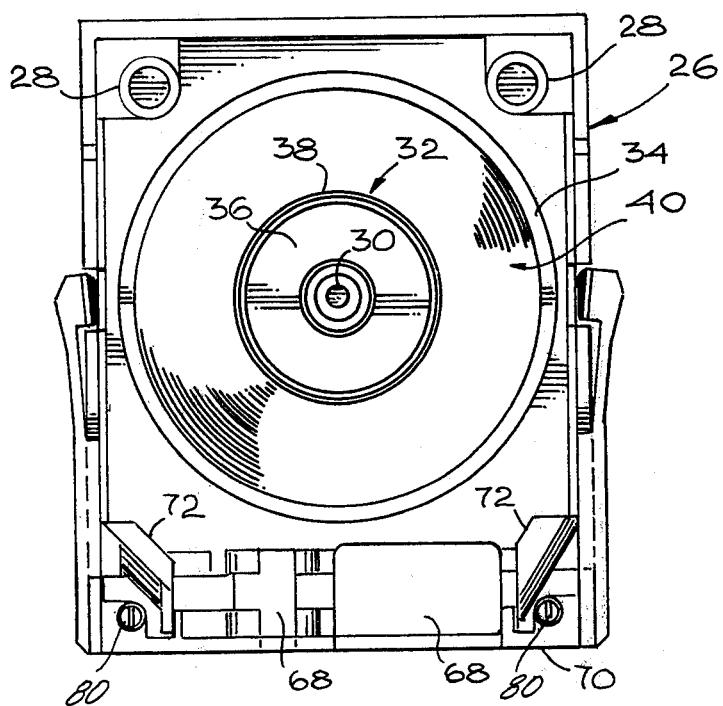
FIG. 9 is a schematic top plan view of the base member and tape holder of the cartridge of FIG. 1; and, FIG. 10 is a schematic side elevation, partly broken away, of the tape holder, tape and brake bar of the cartridge of FIG. 1, view "a" showing a large tape roll on the holder and view "b" a small tape roll on the holder.

As noted more particularly in FIGS. 7 and 9, the front end 70 of cartridge 20 includes a spaced pair of diagonally sloped or oriented tape guides 72 which cause vertically aligned tape 41 from roll 40, trained therearound, to first assume the desired horizontal orientation and then return to roll 40 in the proper vertical orientation. One or more guideways 74 may also be formed on end 70 to aid in causing these changes in tape 41 orientation.

Figure 5:
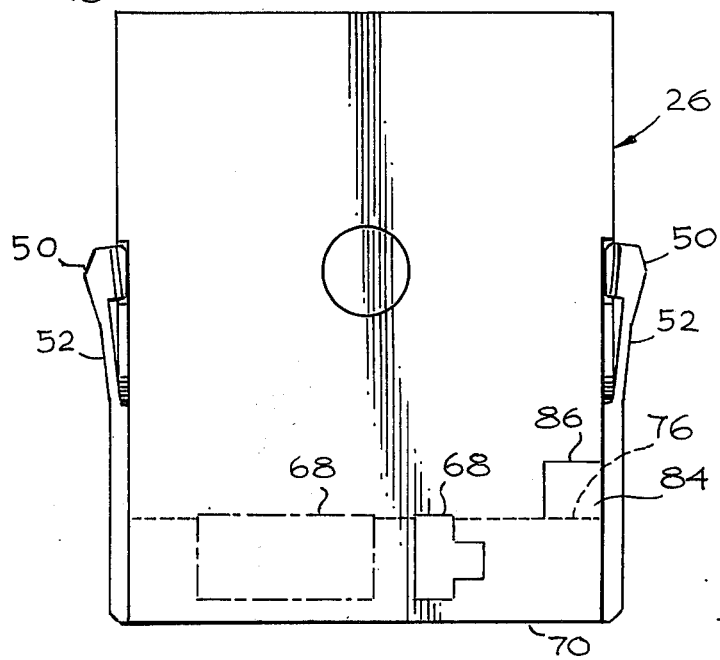
FIG. 5 is a schematic bottom plan view of the tape cartridge of FIG. 1.
Figure 6:
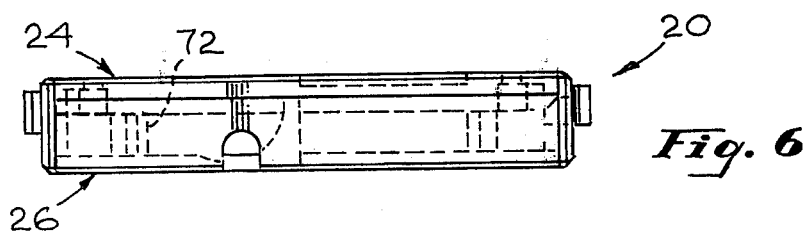
FIG. 6 is a schematic front end view of the tape cartridge of FIG. 1, showing the front end of said cartridge closed.

A desirable feature of cartridge 20, as shown in FIGS. 5 and 7, is that base member 26 is provided with a transverse score line 76 or the like so that front portion 78 of end 70 may be opened at any time, that is, caused to pivot down around score line 76 so as to expose tape guides 72, guide(s) 74 and tape 41 in order to permit inspection of the same, and to allow one to properly align tape 41 with guides 72 and guideway(s) 74 in assembling cartridge 20 and in repairing or replacing tape 41. Pins 80 secured to portion 78 releasably snap into apertures 82 in top cover 24 so as to releasably secure portion 78 in the closed-end position shown in FIG. 6.

Cartridge 20 may also be provided, for example, in base member 26 adjacent front end 70, with a removable closure or knock-out 84 covering an aperture 86 through which a socalled erase prevention sensing pin (not shown) can extend when cartridge 20 is in place in a sound reproducing device, so as to prevent the recording-playback or erase head (not shown) or associated mechanism of such device to magnetically erase tape 41.

Cartridge 20 can be easily fabricated of inexpensive durable materials such as polytetrafluoroethylene, polyethylene or the like, plastic or other suitable materials. It includes only a few parts, all of which can be easily assembled automatically and can be readily repaired and replaced. Various other advantages and features of the present device are as set forth in the foregoing.

Various modifications, changes, alterations and additions can be made in cartridge 20, its components and their parameters. All such changes, modifications, alterations and additions as are within the scope of the appended claims form part of the present invention.

What is claimed is:

1. An improved endless sound reproducing tape cartridge, said cartridge comprising, in combination:
   a. a hollow casing comprising
      i. a top cover, and
      ii. a base member releasably secured thereto;
   b. a tape holder rotatably received in said casing;
   c. an endless roll of sound reproducing tape disposed on said holder; and,
   d. improved brake means, including
      i. a resiliently movable portion of said top cover,
      ii. a brake bar carried by said movable cover portion and normally positioned against at least one of said holder and said roll to prevent rotation thereof, and
      iii. biasing means secured to the outside of said casing for automatically biasing said movable cover portion and brake bar up out of contact with said holder and roll when said cartridge is placed in a sound reproducing mechanism.

2. The improved cartridge of claim 1 wherein said biasing means includes a resilient arm bearing a wedge-shaped biasing head adjacent one end thereof.

3. The improved cartridge of claim 2 wherein said casing defines an opening below said movable cover portion and wherein said head is biasable into said opening and against the underside of said movable cover portion to lift the same.

4. The improved cartridge of claim 3 wherein said biasing means includes a pair of said arms and heads on opposite sides of said casing, wherein there are a pair of said openings on said opposite casing sides, and wherein said heads are biasable through said openings into contact with the underside of at least one of said movable cover portion and said brake bar on said opposite sides thereof.

5. The improved cartridge of claim 4 wherein said cover includes depending opposed margins, wherein said openings are disposed in said depending opposed margins so that said heads contact and act only upon said top cover and not said base member, whereby distortion of said bottom member is prevented.

6. The improved cartridge of claim 4 wherein said arms are integral with one of said top cover and said base member.

7. The improved cartridge of claim 6 wherein said arms are integral with said base member.

8. The improved cartridge of claim 1 wherein said holder comprises a generally flat generally horizontally extending disc and a central spindle connected thereto and extending upwardly therefrom, said spindle having a raised periphery.

9. The improved cartridge of claim 8 wherein said disc has a depressed portion adjacent said spindle whereby the upper margin of that part of said tape roll which is supported on said depressed portion extends upwardly no further than the top of said spindle periphery.

10. The improved cartridge of claim 8 wherein said spindle periphery is dimensioned relative to said tape roll such that any portion of said roll on said disc outside said depressed portion has the upper margin aligned with the top of said spindle periphery.

11. The improved cartridge of claim 10 wherein said brake bar is dimensioned to contact the upper margin of any portion of said roll which is outside said depressed portion, or in the event that no portion of said roll is outside said depressed portion, then the top of said spindle periphery when said movable portion is not biased upwardly by said heads.

12. The improved cartridge of claim 1 wherein said top cover and said base member bear opposed vertically oriented releasably locking members which permit assembly of said casing through automated vertical movements.

13. The improved cartridge of claim 12 wherein said casing includes a removable portion covering an aperture adapted to receive an erase prevention sensing pin from a tape sound reproducing mechanism.

14. The improved cartridge of claim 1 wherein said casing includes an openable and closable front portion which bears a plurality of tape guides whereby disposal of said tape around said guides is facilitated.

* * * * *